United States Patent [19]

Smith

[11] Patent Number: 5,119,224
[45] Date of Patent: Jun. 2, 1992

[54] APPARATUS AND METHOD FOR FIBER OPTICS COMMUNICATION WITH DARK CURRENT CORRECTION

[75] Inventor: Clyde Smith, Lake Ronkonkoma, N.Y.

[73] Assignee: Fiber Options Corporation, Bohemia, N.Y.

[21] Appl. No.: 451,426

[22] Filed: Dec. 14, 1989

[51] Int. Cl.$^5$ .......................................... H04B 10/24
[52] U.S. Cl. ................... 359/153; 250/214B; 359/161
[58] Field of Search ................ 358/213.16; 455/606, 455/607, 617, 619, 609–613; 250/214 AL, 214 B; 359/161, 152, 153

[56] References Cited

U.S. PATENT DOCUMENTS

| | | | |
|---|---|---|---|
| 4,168,427 | 9/1979 | Hubbard | 455/606 |
| 4,527,117 | 7/1985 | Morgan et al. | 324/121 R |
| 4,551,762 | 11/1985 | Levine | 358/221 |
| 4,654,891 | 3/1987 | Smith | 455/617 |
| 4,689,826 | 8/1987 | Smith | 455/613 |
| 4,786,969 | 11/1988 | Shouji | 358/213.16 |
| 4,820,917 | 4/1989 | Ioannou | 250/227 |

FOREIGN PATENT DOCUMENTS

| | | | |
|---|---|---|---|
| 3203094 | 8/1983 | Fed. Rep. of Germany | 455/606 |
| 0123617 | 10/1978 | Japan | 358/213.16 |

Primary Examiner—Edward L. Coles, Sr.
Assistant Examiner—L. Pascal
Attorney, Agent, or Firm—Martin Novack

[57] ABSTRACT

The disclosure is directed to an apparatus and method for receiving and processing an optical signal representative of electronic information. In an embodiment of the invention there is provided a light-emitting diode which is reverse biased to receive the optical signal and convert the optical signal to an electronic signal. Means are provided for determining time periods during which the electronic signal produced by the light-emitting diode is below a predetermined threshold. Means are provided for generating a dark current error signal indicative of a sampled output of the light-emitting diode during said time periods. Means are also provided for holding the error signal during other time periods when the electronic signal produced by the light-emitting diode is not below the predetermined threshold. Finally, means are provided for modifying the electronic signal produced by the light-emitting diode as a function of the held error signal to obtain an output electronic signal. In the disclosed embodiment, the light-emitting diode is reverse biased and coupled across an input of an operational amplifier which is arranged to produce an output voltage that depends upon the current in the light-emitting diode. A resistor is coupled between the output of the operational amplifier and the input of a voltage buffer. A threshold detector determines when the output of the voltage buffer is below a predetermined threshold, and produces an enable signal when the voltage buffer output is below the threshold. A sample-and-hold circuit samples the output of the buffer in response to the enable signal. The output of the sample-and-hold circuit is coupled via a resistor to the input of the voltage buffer. An output terminal is coupled to the output of the voltage buffer.

8 Claims, 1 Drawing Sheet

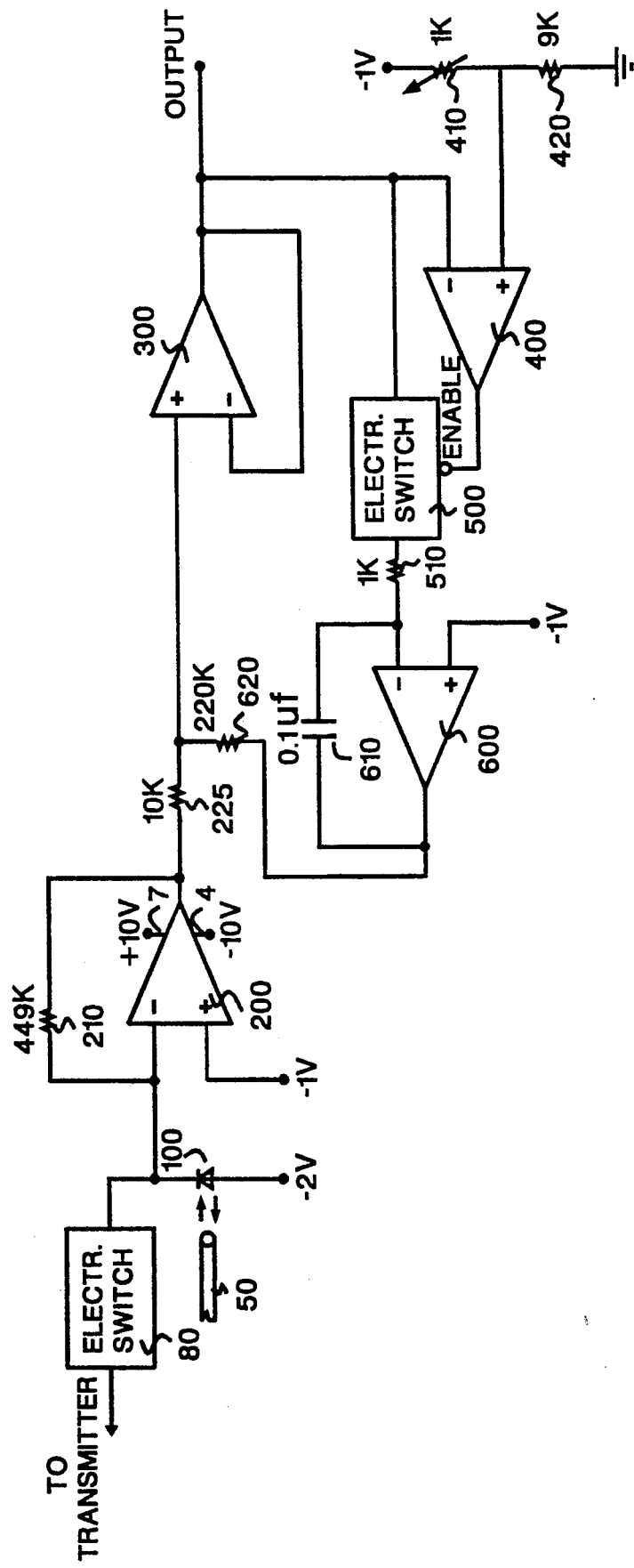

APPARATUS AND METHOD FOR FIBER OPTICS COMMUNICATION WITH DARK CURRENT CORRECTION

BACKGROUND OF THE INVENTION

This invention relates to fiber optics communication systems and, more particularly, to an apparatus and method for improving operation of such systems by reducing extraneous signals therein.

Fiber optics communications systems are in widespread use, and find application for communicating a wide variety of information, including telephone, video, and audio information.

In one type of fiber optics communications, a single light-emitting diode ("LED") is used in a system that both transmits and receives information over a fiber optics link. Typically, the LED is coupled to both a transmitter and a receiver via a solid state switch. In the transmitting mode, a suitable modulated electronic signal is applied to the LED which is forward biased and operates to generate light as a function of the applied electronic signal. In the receiving mode, the LED is reverse biased, and draws a certain amount of leakage current, called "dark current". This leakage current adds to the current that is generated as a result of the detection of received light, and adds a spurious component to the detected signal. The use of a single diode for both the transmitting and receiving functions is advantageous from the standpoint of efficiency, but the exhibited dark current is troublesome.

It is among the objects of the present invention to reduce or eliminate the problem of dark current in the described type of system, or in any system wherein an LED is utilized to receive and detect optical signals.

SUMMARY OF THE INVENTION

The present invention is directed to and apparatus and method for receiving and processing an optical signal representative of electronic information. In accordance with an embodiment of the apparatus of the invention there is provided a light-emitting diode which is reverse biased to receive the optical signal and convert the optical signal to an electronic signal. Means are provided for determining time periods during which the electronic signal produced by the light-emitting diode is below a predetermined threshold. Means are provided for generating a dark current error signal indicative of a sampled output of the light-emitting diode during said time periods. Means are also provided for holding the error signal during other time periods when the electronic signal produced by the light-emitting diode is not below the predetermined threshold. Finally, means are provided for modifying the electronic signal produced by the light-emitting diode as a function of the held error signal to obtain an output electronic signal.

In the disclosed embodiment, the light-emitting diode is reverse biased and coupled across an input of an operational amplifier which is arranged to produce an output voltage that depends upon the current in the light-emitting diode. A resistor is coupled between the output of the operational amplifier and the input of a voltage buffer. A threshold detector determines when the output of the voltage buffer is below a predetermined threshold, and produces an enable signal when the voltage buffer output is below the threshold. A sample-and-hold circuit samples the output of the buffer in response to the enable signal. The output of the sample-and-hold circuit is coupled via a resistor to the input of the voltage buffer. An output terminal is coupled to the output of the voltage buffer.

Further features and advantages of the invention will become more readily apparent from the following detailed description when taken in conjunction with the accompanying drawing.

BRIEF DESCRIPTION OF THE DRAWING

The drawing is a schematic diagram, partially in block form, of an apparatus in accordance with an embodiment of the invention and which can be used to practice an embodiment of the method of the invention.

DESCRIPTION OF THE PREFERRED EMBODIMENT

Referring to FIG. 1, there is shown a schematic diagram of a circuit in accordance with an embodiment of the invention, and which can be used to practice an embodiment of the method of the invention. A light-emitting diode ("LED") 100 is provided and is optically coupled to an optical fiber, as represented at 50. The light-emitting diode is coupled to a transmitter (not shown), for example via a solid state switch 80. The transmitter function is not, per se, an inventive feature hereof, and is not described in detail.

The light-emitting diode 100 is coupled, as shown, between the inverting (or negative) input terminal of operational amplifier 200 and a negative bias potential which, in the present embodiment, is at −2 volts. The noninverting (or positive) input terminal of the operational amplifier 200 is coupled to a −1 volt reference potential. The output of the operational amplifier 200 is coupled, in a feedback arrangement, to the positive input terminal thereof via a feedback resistor 210 which, in the present embodiment, is a 499K ohm resistor. The operational amplifier may be, for example, an MC34080P, sold by Motorola. The terminals numbered 4 and 7 of the operational amplifier can be respectively coupled to reference potentials of −10 volts and +10 volts.

The output of operational amplifier 200 is coupled, via a resistor 225, to the non-inverting input terminal of another operational amplifier 300. In the present embodiment, the resistor 220 has a value of 10K ohms. The operational amplifier 300, which is configured as a unity gain voltage follower, or voltage buffer, may be, for example, one-half of a TL062CN, sold by Texas Instruments. As is conventional for a buffer of this type, the output is fed back directly to the inverting input terminal of the operational amplifier, as shown in the diagram.

The output of operational amplifier 300 is coupled to the inverting input terminal of a voltage comparator 400. This comparator, which may be for example a TLC372CP sold by Texas Instruments, has its non-inverting input terminal coupled to the intermediate point of a voltage divider which, in the present embodiment, includes a resistor 410 that is coupled to a −1 volt reference potential and a resistor 420 that is coupled to ground reference potential. In the present embodiment, the resistor 400 is a variable resistor having a range around 1K ohm, and the resistor 420 has a value of 9K ohm.

The output of comparator 400 is coupled to the enable terminal of an electronic switch 500, which may be a CD4016 electronic switch as sold by Harris/RCA Corp. The input terminal of electronic switch 500 receives the output of operational amplifier 300. The output of electronic switch 500 is coupled, via resistor 510, which is a 1K ohm resistor in the present embodiment, to the input of a sample-and-hold circuit. In the present embodiment, the sample-and-hold circuit is implemented using an operational amplifier 600, which may be the other half of the Texas Instruments TL062CN chip used as the operational amplifier 300 above. The operational amplifier 600 has a capacitor 610, which in the present embodiment is a 0.1 microfarad capacitor, coupled between its output and its inverting input. The non-inverting input of operational amplifier 600 is coupled to a −1 volt reference potential. The output of operational amplifier 600 is coupled, via a resistor 620, which in the present embodiment is a 220K ohm resistor, to the junction between the resistor 225 and the input to the operational amplifier 300.

In operation, in the absence of current through LED 100, and with the non-inverting input of operational amplifier 200 at −1 volt, the output of the operational amplifier 200 would normally be at −1 volt. When there is LED current due to received signal, the output of operational amplifier 200 will be more positive than −1 volt. Also, the presence of dark current will make the output of operational amplifier 200 slightly more positive than it would otherwise be, so in the absence of optical signal input to the LED, the output of operational amplifier 200 will be slightly more positive than −1 volt. The output of operational amplifier 300 (which, as noted above, is configured as a unity gain voltage follower), will tend to track the output of the operational amplifier 200 (except with regard to the voltage applied via resistor 620, to be described). The comparator 400 receives at its non-inverting input a signal that is slightly more positive than −1 volt, by virtue of the voltage divider 410 and 420. [This reference voltage is adjustable by adjustment of resistor 410.] The other input to the comparator 400 is the output of operational amplifier 300. Therefore, the comparator 400 produces an enabling output to switch 500 only when the output of operational amplifier 300 is more negative than 0.9 volts (or a similar operator-adjusted value). When the comparator output is present, the output of operational amplifier 300 is passed by the electronic switch 500 to the sample and hold circuit. This will be true only during so-called "quiet" periods when the LED 100 is neither transmitting nor receiving, for example in a rest state of data transmission/reception or the blanking time of a television signal, etc.. During all other times, there will be no comparator output to enable the electronic switch 500, and the righthand side of resistor 510 will be coupled to an open circuit. However, during a "quiet period", when there is no signal applied on the LED, the output of the operational amplifier 300 will be applied (through electronic switch 500) to the sample-and-hold circuit. In particular, the capacitor 610 will be charged through the resistor 510. Thus, the voltage held at the output of operational amplifier 600 will be determined by the dark current in the LED 100 during the "quiet" period. The output of the operational amplifier 600 will go more negative than −1 volt by an amount that depends on the dark current input that is carried through to the sample and hold circuit. Now, it is seen that during ordinary optical signal reception, the voltage at the junction between resistors 225 and 620 will be reduced by an amount that depends on the previously measured and "held" dark current signal. In this manner, the input to voltage buffer 300, and therefore the circuit output voltage at the output of buffer 300, is adjusted to take account of the dark current. During each "quiet" period, the dark current will be automatically measured and the value held by the sample-and-hold circuit will be updated.

The invention has been described with reference to a particular preferred embodiment, but variations within the spirit and scope of the invention will occur to those skilled in the art. For example, it will be understood that alternative circuit configurations can be employed for the various elements of the apparatus set forth.

I claim:

1. Apparatus for receiving and processing an optical signal representative of electronic information, comprising:
   a light-emitting diode which receives said optical signal, said diode being reverse biased and coupled to an input of an operational amplifier which is arranged to produce an output voltage that depends upon the current in said light-emitting diode;
   a voltage buffer;
   a resistor coupled between the output of said operational amplifier and the input of said voltage buffer;
   threshold detector means for determining when the output of said voltage buffer is below a predetermined threshold, and for producing an enable signal when said voltage buffer output is below said threshold;
   a sample-and-hold circuit for sampling the output of said buffer in response to said enable signal, the output of said sample-and-hold circuit being coupled via a resistor to the input of said voltage buffer; and
   an output terminal coupled to the output of said voltage buffer.

2. Apparatus as defined by claim 1, wherein said sample-and-hold circuit is operative to produce an output voltage that is a function of the buffer output voltage applied to said sample-and-hold circuit during said enable signal.

3. Apparatus as defined by claim 2, wherein said light-emitting diode is coupled to the inverting input of said operational amplifier, and wherein the non-inverting input of said operational amplifier is coupled to a reference potential; and wherein said sample-and-hold circuit comprises a further operational amplifier having a capacitor in feedback arrangement between its output and its inverting input, the non-inverting input of said further operational amplifier being coupled to said reference potential.

4. Apparatus as defined by claim 3, wherein the output of said voltage buffer is coupled to the inverting input of said further operational amplifier.

5. Apparatus as defined by claim 1, wherein said light-emitting diode is coupled to the inverting input of said operational amplifier, and wherein the non-inverting input of said operational amplifier is coupled to a reference potential; and wherein said sample-and-hold circuit comprises a further operational amplifier having a capacitor in feedback arrangement between its output and its inverting input, the non-inverting input of said further operational amplifier being coupled to said reference potential.

6. Apparatus as defined by claim 5, wherein the output of said voltage buffer is coupled to the inverting input of said further operational amplifier.

7. Apparatus as defined by claim 1, wherein said light-emitting diode is also coupled, via a switch, to a transmitter which energizes said light-emitting diode to produce a transmitted optical signal.

8. Apparatus as defined by claim 7, wherein said transmitted optical signal is transmitted and received over an optical fiber.

* * * * *